(12) United States Patent
Nakao et al.

(10) Patent No.: US 10,240,504 B2
(45) Date of Patent: Mar. 26, 2019

(54) CONTROL DEVICE AND CONTROL METHOD FOR REDUCING AGENT INJECTION DEVICE, AND REDUCING AGENT INJECTION DEVICE

(71) Applicant: Bosch Corporation, Tokyo (JP)

(72) Inventors: Eiji Nakao, Saitama (JP); Fumiyasu Kurogi, Saitama (DE); Akira Kunishima, Saitama (DE); Atsushi Kikuchi, Saitama (DE); Hiroyuki Watanabe, Saitama (DE); Syogo Tashiro, Saitama (DE); Wataru Domon, Saitama (DE)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 15/520,289

(22) PCT Filed: Sep. 30, 2015

(86) PCT No.: PCT/JP2015/077781
§ 371 (c)(1),
(2) Date: Apr. 19, 2017

(87) PCT Pub. No.: WO2016/063697
PCT Pub. Date: Apr. 28, 2016

(65) Prior Publication Data
US 2017/0321582 A1 Nov. 9, 2017

(30) Foreign Application Priority Data
Oct. 23, 2014 (JP) .................. 2014-216277

(51) Int. Cl.
*F01N 3/20* (2006.01)
*B01D 53/90* (2006.01)
*B01D 53/94* (2006.01)

(52) U.S. Cl.
CPC ............. *F01N 3/208* (2013.01); *B01D 53/90* (2013.01); *B01D 53/9431* (2013.01);
(Continued)

(58) Field of Classification Search
USPC ................. 60/274, 286, 295, 297, 301, 303
See application file for complete search history.

(56) References Cited

U.S. PATENT DOCUMENTS

| 8,388,323 | B2* | 3/2013 | Cooke | F01N 3/2066 417/366 |
|---|---|---|---|---|
| 9,458,748 | B2* | 10/2016 | David | G01K 7/16 |
| 9,757,748 | B2* | 9/2017 | Sykes | H01F 7/1811 |
| 2005/0235632 | A1* | 10/2005 | Tarabulski | F01N 3/2066 60/282 |
| 2007/0092413 | A1 | 4/2007 | Hirata et al. | |
| 2009/0077949 | A1 | 3/2009 | Kleinknecht | |

(Continued)

FOREIGN PATENT DOCUMENTS

| CN | 103261601 A | 8/2013 |
|---|---|---|
| JP | 2005127318 | 5/2005 |

(Continued)

OTHER PUBLICATIONS

International Search Report for Application No. PCT/JP2015/077781 dated Nov. 2, 2015 (English Translation, 4 pages).

*Primary Examiner* — Binh Q Tran
(74) *Attorney, Agent, or Firm* — Michael Best & Friedrich LLP (57) ABSTRACT

An amount of electric power consumption by a battery is reduced, and deterioration of a coil is suppressed by efficiently heating an injector and melting urea crystals at an early stage.
A control device for a reducing agent injection device fills the device with a reducing agent at a start-up of an internal combustion engine and executes control for injecting the reducing agent into an exhaust passage of the internal combustion engine by the injector. The control device includes an energization control section that executes energization control in which, after an exhaust temperature of the internal combustion engine becomes equal to or higher than (Continued)

a specified threshold value, a temperature of the injector is increased by energizing the coil of the injector for a specified time and melting of the crystals of the reducing agent precipitated in the injector is promoted.

11 Claims, 6 Drawing Sheets

(52) U.S. Cl.
CPC .............. *B01D 2251/2067* (2013.01); *B01D 2255/911* (2013.01); *B01D 2258/012* (2013.01); *F01N 2560/06* (2013.01); *F01N 2610/02* (2013.01); *F01N 2610/10* (2013.01); *F01N 2610/146* (2013.01); *F01N 2900/1806* (2013.01)

(56) References Cited

U.S. PATENT DOCUMENTS

2012/0255282 A1* 10/2012 Nagata ................ F01N 3/208
 60/274
2013/0269321 A1* 10/2013 Watanabe ............ F01N 3/208
 60/274

FOREIGN PATENT DOCUMENTS

| JP | 201174889 | 4/2011 |
| JP | 201291728 | 5/2012 |
| JP | 201412992 | 1/2013 |
| JP | 2013221425 | 10/2013 |
| JP | 2014177883 | 9/2014 |
| WO | 2012090801 | 7/2012 |

* cited by examiner

CONTROL DEVICE AND CONTROL METHOD FOR REDUCING AGENT INJECTION DEVICE, AND REDUCING AGENT INJECTION DEVICE

BACKGROUND OF THE INVENTION

The invention relates to a control device and a control method for a reducing agent injection device, each of which controls a reducing agent injection device, and to a reducing agent injection device that injects a reducing agent into an exhaust passage of an internal combustion engine.

Exhaust gas of an internal combustion engine, such as a diesel engine, mounted on a vehicle includes NOx (nitrogen oxides). As a device that reduces and breaks down such NOx into nitrogen, water vapor, and the like so as to purify the exhaust gas, a urea selective catalystic reduction (SCR) system has been in practical use. The urea SCR system is a system that uses a urea aqueous solution as a reducing agent and makes NOx in the exhaust gas react with ammonia to break down NOx.

Such a urea SCR system includes: a selective reduction catalyst that is disposed in an exhaust passage; and a reducing agent injection device that injects the urea aqueous solution into a portion of the exhaust passage on an upstream side of the selective reduction catalyst. The selective reduction catalyst is a catalyst with a function of: adsorbing ammonia that is produced when the urea aqueous solution is broken down; and promoting a reduction reaction of ammonia with NOx in the inflow exhaust gas. The reducing agent injection device includes: a pump that pressure-feeds the urea aqueous solution accommodated in a storage tank; an injector that injects the urea aqueous solution pressure-fed by the pump; and a control device that controls the pump and the injector.

A freezing point of the urea aqueous solution, which is used in the urea SCR system, differs by concentration. A temperature thereof at the lowest freezing point is approximately 11° C. below zero. Thus, the urea aqueous solution is collected in the storage tank from the system during a stop of the internal combustion engine in order to avoid a situation where the urea aqueous solution is frozen during a stop of the vehicle, and a volume thereof is thereby increased, which causes damage to the pump, the injector, a pipe through which the urea aqueous solution flows, or the like. The collected urea aqueous solution is refilled in the system at a next start-up of the internal combustion engine.

In the urea SCR system, when the remaining urea aqueous solution in the injector is heated by heat that is transmitted from an exhaust pipe during the stop of the internal combustion engine, moisture is possibly evaporated, and urea crystals are possibly precipitated. More specifically, in the case where a temperature of the injector is dropped to an atmospheric temperature after the urea crystals are precipitated due to evaporation of the moisture or after urea concentration in the urea aqueous solution is increased due to the evaporation of the moisture, the urea crystals that can no longer be dissolved in the aqueous solution are possibly precipitated. When such urea crystals are precipitated, a valve body of the injector is stuck, which becomes a cause of actuation failure of the injector at the next start-up of the internal combustion engine.

However, because crystallized urea is likely to be dissolved in water, the actuation failure of the injector is solved by supplying the urea aqueous solution to the injector. In addition, such crystals are melted at a high temperature. Thus, when an exhaust temperature is increased, the actuation failure of the injector is solved by the heat that is transmitted via the exhaust pipe. However, the exhaust gas is also produced in a period from the start-up of the internal combustion engine to time at which the urea crystals are dissolved in the urea aqueous solution or melted by exhaust heat. Thus, it is desired to promptly melt the urea crystals.

Here, although not a technique of melting the crystallized urea, a technique of inducing heat in a coil of the injector by energizing the coil to defrost the frozen urea aqueous solution in the injector has been known. For example, JP-A-2013-221425 discloses a technique of supplying a current in such a degree that the urea aqueous solution is not injected to the coil of the injector, so as to induce the heat in the coil when the temperature of the urea aqueous solution in the storage tank is lower than a predetermined lower limit temperature.

However, the technique described in JP-A-2013-221425 has a purpose of defrosting the frozen urea aqueous solution and thus is not a technique of melting the urea crystals that are precipitated in the injector. Furthermore, in the technique described in JP-A-2013-221425, the coil is energized when the temperature of the urea aqueous solution in the storage tank is lower than the lower limit temperature. Meanwhile, the urea crystals can exist at a temperature at which the urea aqueous solution is in a defrosted state. Thus, the technique described in JP-A-2013-221425 has no intention of melting the urea crystals.

If the technique described in JP-A-2013-221425 is applied to melt the urea crystals, the following problems are concerned. That is, members, such as the exhaust pipe, that are adjacent to the injector are also at a low temperature at the start-up of the internal combustion engine. Thus, in the case where the current is supplied to the coil immediately after the start-up, the heat generated by the coil is transferred to peripheral members. For this reason, the coil is energized for a long time before the urea crystals are melted. Therefore, an amount of electric power consumption by a battery is possibly increased. In addition, when an energization time of the coil is extended, thermal deterioration of the coil possibly occurs.

SUMMARY OF THE INVENTION

The invention has been made in view of the above problem, and therefore a purpose of the invention is to provide new and improved control device and control method for a reducing agent injection device, each of which can efficiently heat an injector to melt urea crystals at an early stage by energizing a coil of the injector for a short time at a start-up of an internal combustion engine, and to a reducing agent injection device.

In order to solve the above problem, according to a certain perspective of the invention, a control device for a reducing agent injection device that fills the device with a reducing agent at a start-up of an internal combustion engine and executes control for injecting the reducing agent into an exhaust passage of the internal combustion engine by an injector is provided. The control device is characterized by including an energization control section that executes energization control in which, after an exhaust temperature of the internal combustion engine becomes equal to or higher than a specified threshold value, a temperature of the injector is increased by energizing a coil of the injector for a specified time and melting of crystals of the reducing agent precipitated in the injector is promoted.

The control device may include an estimated defrosting time calculation section that calculates an estimated defrosting time required to defrost the frozen reducing agent. In the case where the estimated defrosting time is not zero, the energization control section may start energizing the coil of the injector before a lapse of the estimated defrosting time after the exhaust temperature of the internal combustion engine becomes equal to or higher than the specified threshold value.

The energization control section may start energizing the coil when a defrosting execution time reaches a threshold value as a value obtained by subtracting the specified time from the estimated defrosting time.

In the case where the estimated defrosting time is zero, the energization control section may start energizing the coil when the exhaust temperature of the internal combustion engine becomes equal to or higher than the specified threshold value.

The specified time may have a value that is set in advance.

The specified time may have a value that is set at least on the basis of an outside air temperature.

The specified time may have a value that is further set on the basis of a power supply voltage of the injector.

The estimated defrosting time calculation section may calculate the estimated defrosting time at least on the basis of a temperature of the reducing agent.

The energization control section may permit execution of injection control of the reducing agent after a lapse of the specified time.

The control device may include a crystallization estimation section that estimates whether the crystals are precipitated in the injector before a last stop of the internal combustion engine. The energization control section may execute the energization control of the coil when precipitation of the crystals is estimated.

In addition, in order to solve the above problem, according to another perspective of the invention, a control method for a reducing agent injection device that fills the device with a reducing agent at a start-up of an internal combustion engine and executes control for injecting the reducing agent into an exhaust passage of the internal combustion engine by the injector is provided. The control method is characterized by including a step of executing energization control in which, after an exhaust temperature of the internal combustion engine becomes equal to or higher than a specified threshold value, a temperature of the injector is increased by energizing a coil of the injector for a specified time and melting of crystals of the reducing agent precipitated in the injector is promoted.

Furthermore, in order to solve the above problem, according to yet another perspective of the invention, a reducing agent injection device characterized by comprising: any one of the above-described control devices; a pump that pressure-feeds a reducing agent in a storage tank; and an injector that injects the reducing agent into an exhaust passage of an internal combustion engine is provided.

As it has been described so far, according to the invention, at the start-up of the internal combustion engine, the coil of the injector is energized for a short time after the exhaust temperature becomes equal to or higher than the specified threshold value. In this way, the injector is efficiently heated, and urea crystals can be melted at an early stage. Thus, an amount of electric power consumption by a battery can be reduced, and deterioration of the coil can be suppressed.

DETAILED DESCRIPTION

A detailed description will hereinafter be made on a preferred embodiment of the invention with reference to the accompanying drawings. Note that components having substantially the same functional configuration are denoted by the same reference numeral and a description thereon will not be repeated.

Figure 1:
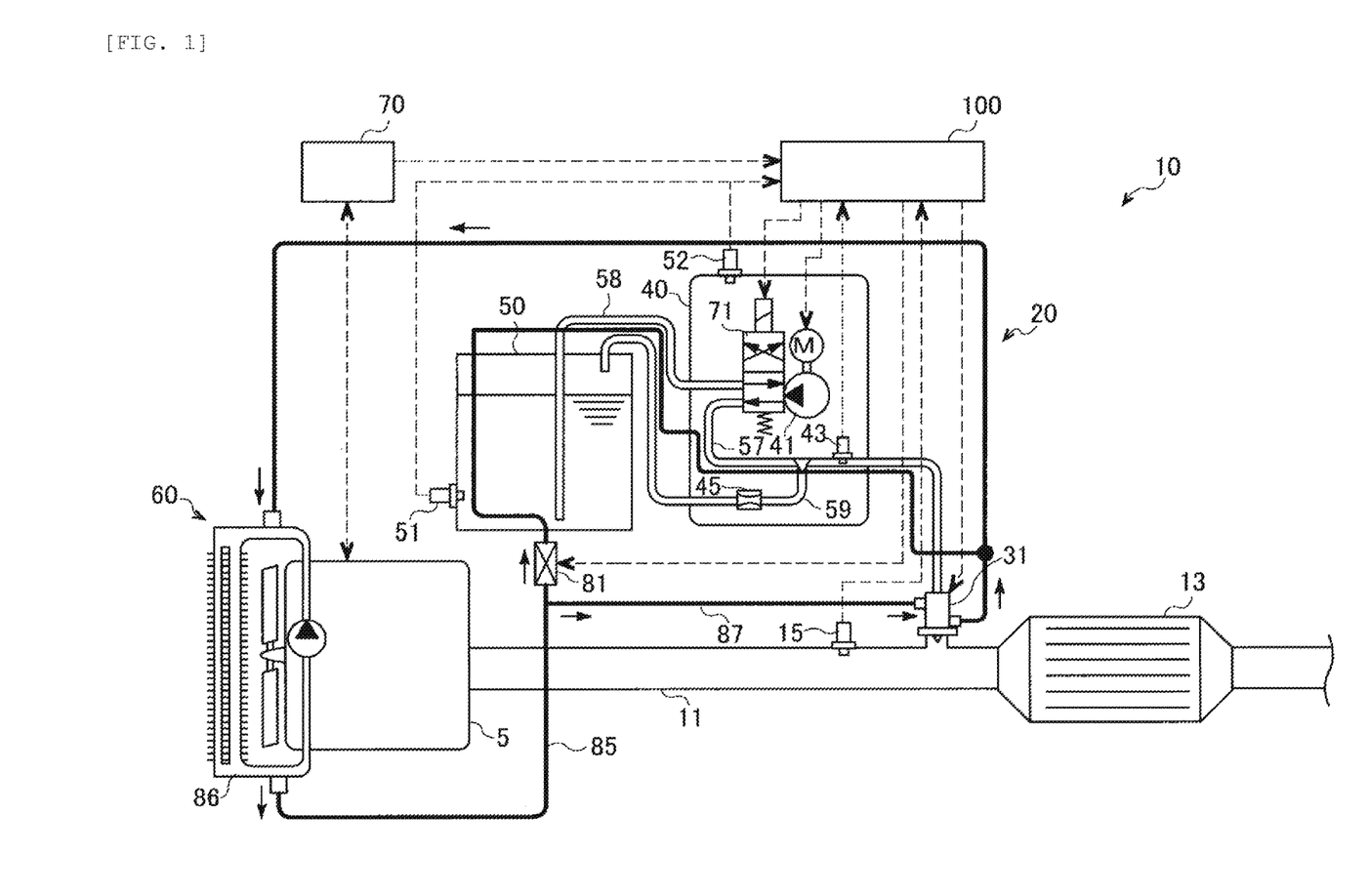
FIG. 1 is a schematic view of a urea SCR system that includes a reducing agent injection device according to an embodiment of the invention.

First, a description will be made on an overall configuration example of a urea SCR system 10 that includes a reducing agent injection device 20 according to a first embodiment of the invention with reference to FIG. 1. FIG. 1 is a view of a schematic configuration of the urea SCR system 10. The urea SCR system 10 includes a reduction catalyst 13 and the reducing agent injection device 20 as primary elements.

The urea SCR system 10 is a system that uses a urea aqueous solution as a reducing agent to reduce and break down NOx in exhaust gas. The urea aqueous solution can be a urea aqueous solution which has urea concentration of 32.5% and whose freezing temperature is the lowest, for example. The freezing temperature in this case is approximately 11° C. below zero. In addition, the urea aqueous solution is known by such a point that urea is crystallized due to evaporation of moisture, or the like.

The reduction catalyst 13 is disposed in the middle of an exhaust pipe 11 that is connected to an engine 5, and has a function of selectively reducing NOx that is contained in the exhaust gas of the engine 5. In this embodiment, the reduction catalyst 13 adsorbs ammonia that is generated when the urea aqueous solution injected by the reducing agent injection device 20 is broken down, and NOx in the exhaust gas that flows into the reduction catalyst 13 is selectively reduced by ammonia.

The reducing agent injection device 20 injects the urea aqueous solution as the reducing agent into a portion of the exhaust pipe 11 on an upstream side of the reduction catalyst 13. Based on concentration of NOx contained in the exhaust gas, an allowable adsorption amount by ammonia in the reduction catalyst 13, and the like, an injection amount of the urea aqueous solution is controlled such that NOx or ammonia does not flow out to a downstream side of the reduction catalyst 13.

A temperature sensor 15 for detecting an exhaust gas temperature Tgas is provided in the portion of the exhaust pipe 11 on the upstream side of the reduction catalyst 13. The exhaust gas temperature Tgas, which is detected by the temperature sensor 15, is used to estimate a temperature of the reduction catalyst 13. In addition thereto, the exhaust pipe 11 may be provided with a NOx concentration sensor, an ammonia sensor, or the like, which is not depicted.

Next, a detailed description will be made on a configuration of the reducing agent injection device 20. As depicted in FIG. 1, the reducing agent injection device 20 includes: an injector 31 that is fixed to the portion of the exhaust pipe 11 on the upstream side of the reduction catalyst 13; and a pump module 40 having a pump 41 that pressure-feeds the urea aqueous solution in a storage tank 50 to the injector 31.

The injector 31 and the pump module 40 are connected by a first supply passage 57. The first supply passage 57 includes a pressure sensor 43 for detecting pressure of the urea aqueous solution that is supplied to the injector 31. In addition, the storage tank 50 and the pump module 40 are connected by a second supply passage 58. Furthermore, the pump module 40 and the storage tank 50 are also connected by a circulation passage 59. Such a circulation passage 59 is branched from the first supply passage 57 and is connected to the storage tank 50. An orifice 45 is provided in the middle of the circulation passage 59. The orifice 45 has functions of retaining pressure in the first supply passage 57 and allowing a surplus of the urea aqueous solution to flow therethrough to the storage tank 50 side.

In addition, the urea SCR system 10 includes a control device 100 that controls various control elements of the reducing agent injection device 20. The control device 100 can obtain information on an engine control device 70 via a controller area network (CAN), which is not depicted. For example, the control device 100 can obtain information on an operation state of the engine 5, such as a fuel injection amount, injection timing, and an engine speed. Note that the control device 100 and the engine control device 70 are separate control devices in the urea SCR system 10 according to this embodiment; however, the control device 100 and the engine control device 70 may be configured as a single control device.

The pump 41, which is provided in the pump module 40, is constructed of a diaphragm pump or a motor pump of an electric type, for example. Output of the pump 41 is controlled on the basis of a control signal of the control device 100. In this embodiment, the control device 100 is configured to execute feedback control of the output of the pump 41 such that the pressure of the urea aqueous solution detected by the pressure sensor 43 is maintained at a specified target value. In addition, in the case where the urea aqueous solution is frozen at a start-up of the engine 5, the pump 41 waits to be driven until the urea aqueous solution is defrosted.

As the injector 31, an electromagnetic injector whose opening/closing is switched by energization control is used. Such an injector 31 includes a coil and has such a structure that a valve body is moved and the injector 31 is opened by a magnetic force that is generated by energization of the coil. As described above, the pressure of the urea aqueous solution that is supplied to the injector 31 is maintained at the constant pressure, and the control device 100 adjusts a valve opening time in accordance with a target injection amount of the urea aqueous solution.

The pump module 40 includes a flow passage switching valve 71. The flow passage switching valve 71 switches a flow direction of the urea aqueous solution that is pressure-fed by the pump 41. In the case where the urea aqueous solution is injected into an exhaust passage, the flow passage switching valve 71 causes the urea aqueous solution to flow from the storage tank 50 side to the injector 31 side. In this case, a suction port of the pump 41 is connected to the second supply passage 58, and a discharge port of the pump 41 is connected to the first supply passage 57. On the other hand, in the case where the urea aqueous solution is collected into the storage tank 50, the flow passage switching valve 71 causes the urea aqueous solution to flow from the injector 31 side to the storage tank 50 side. In this case, the suction port of the pump 41 is connected to the first supply passage 57, and the discharge port of the pump 41 is connected to the second supply passage 58.

However, means that collects the urea aqueous solution in the storage tank 50 is not limited to have the above configuration. For example, in the case where the pump 41 is a bidirectionally rotatable pump, the pump 41 may rotate reversely to collect the urea aqueous solution. Alternatively, another pump and a collection passage for collection control may be provided.

In addition, the reducing agent injection device 20 includes a first coolant passage 85 and a second coolant passage 87, each of which is configured to circulate a coolant of the engine 5 therethrough. The first coolant passage 85 and the second coolant passage 87 are branched from a cooling passage 86 of an engine cooling device 60 that is provided in the engine 5, and merge into the cooling passage 86 again. The first coolant passage 85 is disposed in a manner to run through the storage tank 50 and the pump module 40. In this embodiment, the first coolant passage 85 is also disposed along the first supply passage 57, the second supply passage 58 of the urea aqueous solution, and the like.

Meanwhile, the second coolant passage 87 is disposed in a manner to run around the injector 31. A switching valve 81 is provided in a portion of the first coolant passage 85 that is located between the storage tank 50 and a branching position of the second coolant passage 87. Opening/closing of the switching valve 81 is switched by the control device 100, and opening/closing of the first coolant passage 85 is thereby controlled. The storage tank 50 and the pump module 40 respectively include temperature sensors 51, 52, each of which detects a temperature Turea of the urea aqueous solution.

When the engine 5 is started, the coolant flows through the second coolant passage 87. In addition, in the case where it is estimated that the urea aqueous solution is frozen on the basis of sensor values of the temperature sensors 51, 52 respectively provided in the storage tank 50 and the pump module 40 or a sensor value of a temperature sensor that detects an outside air temperature or the like, the switching valve 81 is opened, and defrosting control of the urea aqueous solution is executed. A defrosting time at this time may be set to an appropriate time on the basis of the sensor values of the various temperature sensors. Furthermore, also in the case where it is estimated that the urea aqueous solution is frozen again on the basis of the sensor values of the various sensors during an operation of the engine 5, the switching valve 81 may be opened, and heat-retention control may be executed.

After the start-up of the engine 5, the coolant constantly flows through the second coolant passage 87. Accordingly, even in a state where the injector 31 is heated by high-temperature exhaust heat or the like during the operation of the engine 5, the coolant flows through the second coolant passage 87 and can thereby cool the injector 31.

Figure 2:
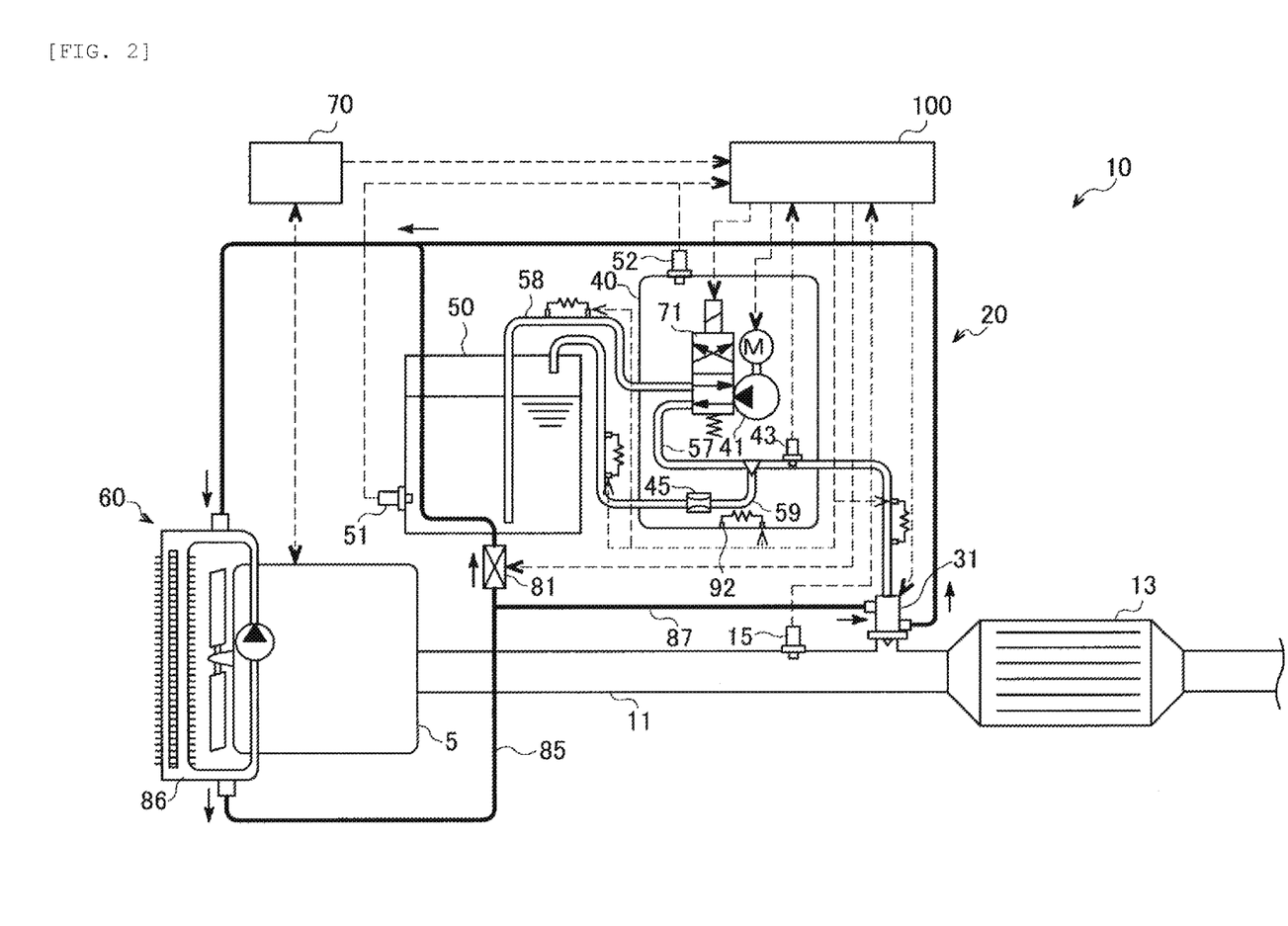
FIG. 2 is a schematic view of a configuration example of the reducing agent injection device that includes an electrothermal heater.

Note that, as depicted in FIG. 2, instead of the coolant of the engine 5, an electrothermal heater 92 or the like may be used to defrost the pump module 40, the first and second supply passages 57, 58, and the like. In this case, the switching valve 81 is controlled on the basis of the sensor value of the temperature sensor 51, which is provided in the storage tank 50. On/Off of the electrothermal heater 92 is controlled on the basis of the sensor value of the temperature sensor 52, which is provided in the pump module 40.

Energization and non-energization of such an electrothermal heater 92 are controlled by the control device 100.

In the case where the temperature Turea of the urea aqueous solution, which is detected by the temperature sensor 52, is equal to or lower than a freezing temperature Tfr of the urea aqueous solution at the start-up of the engine 5 or the like, the electrothermal heater 92 is energized, and defrosting of the frozen urea aqueous solution is promoted. Meanwhile, in the case where the temperature Turea of the urea aqueous solution is equal to or higher than a specified threshold value Thre_turea, which is set in advance, the electrothermal heater 92 is brought into an unenergized state. However, a device that heats the urea aqueous solution in the pump module 40 is not limited to the electrothermal heater 92.

Other than the above, a heating device such as an electrothermal heater may be provided at an appropriate position of the pump module 40, the first supply passage 57, the second supply passage 58, or the like. However, the reducing agent injection device 20 according to this embodiment does not include a cooling device other than the second coolant passage 87 for the injector 31.

Figure 3:
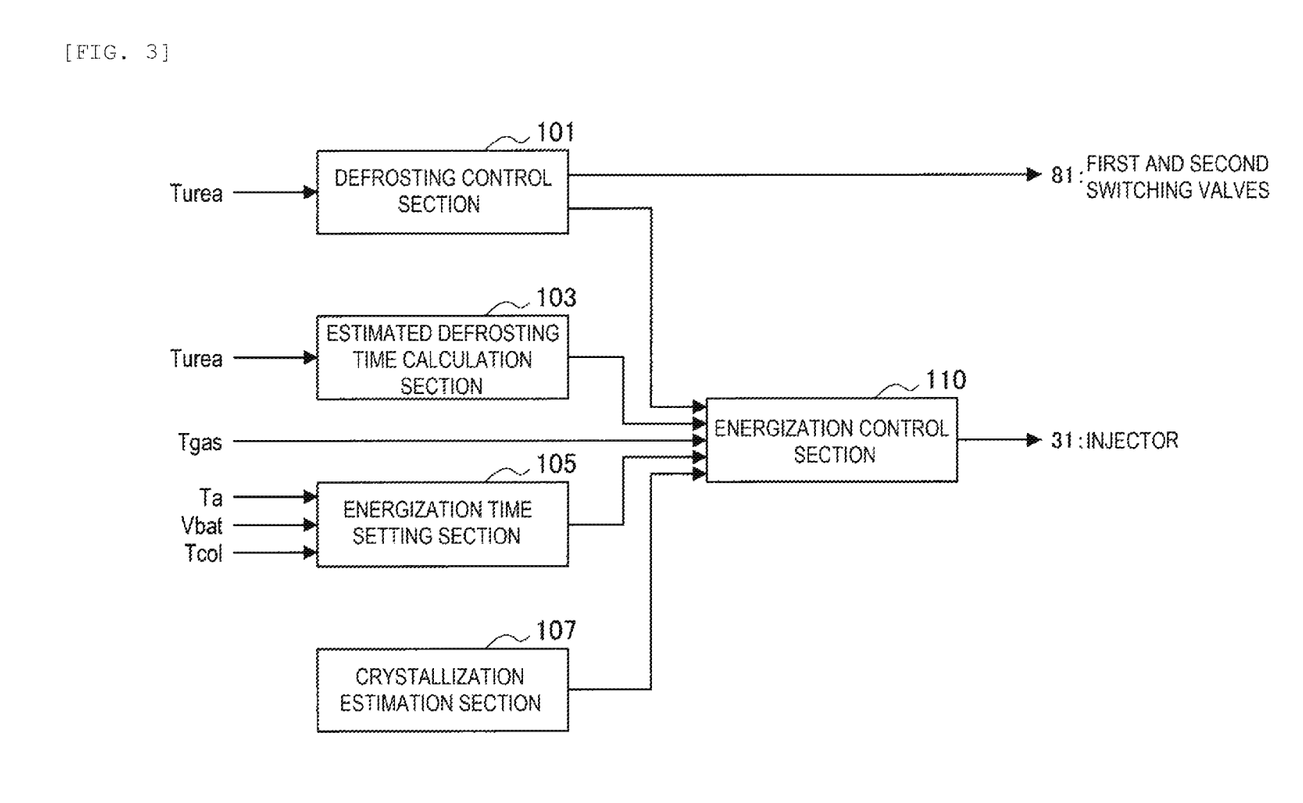
FIG. 3 is a block diagram of a configuration of a control device for the reducing agent injection device according to the same embodiment.

Next, a description will be made on a configuration example of the control device 100 that is used to control the reducing agent injection device 20 according to this embodiment. FIG. 3 is a block diagram that functionally depicts a part of the configuration of the control device 100 that is related to control for promoting melting of urea crystals precipitated in the injector 31. Such a control device 100 is constructed of a known microcomputer and the like as central components. Note that the control device 100, which will be described below, is an example of a device that is used to control the reducing agent injection device 20 provided with the electrothermal heater depicted in FIG. 2.

The control device 100 includes a defrosting control section 101, an estimated defrosting time calculation section 103, an energization time setting section 105, a crystallization estimation section 107, and an energization control section 110. More specifically, each of these sections is realized by execution of a program by the microcomputer. In addition, the control device 100 according to this embodiment can read information on an outside air temperature Ta, information on the exhaust gas temperature Tgas, information on a temperature Tcol of the coolant, information on the temperature Turea of the urea aqueous solution in the storage tank 50, and information on a power supply voltage Vbat of the injector 31.

In the case where it is estimated that the urea aqueous solution is frozen on the basis of the sensor values of the temperature sensors 51, 52 or the sensor value of the temperature sensor that detects the outside air temperature or the like at the start-up of an internal combustion engine, the defrosting control section 101 opens the switching valve 81 and energizes the electrothermal heater 92. For example, in the case where the sensor value of each of the above temperature sensors is equal to or lower than the freezing temperature Tfr of the urea aqueous solution, the defrosting control section 101 opens the switching valve 81 and energizes the electrothermal heater 92. The defrosting time at this time may be set to the appropriate time on the basis of the sensor values of the various temperature sensors.

Meanwhile, in the case where the temperature Turea of the urea aqueous solution becomes equal to or higher than the specified threshold value Thre_turea, which is set in advance, the defrosting control may be terminated. The threshold value Thre_turea is set to an appropriate value within such a range where there is no possibility that the temperature Turea of the urea aqueous solution returns to be equal to or lower than the freezing temperature Tfr thereafter. However, when the threshold value Thre_turea is too high, an amount of electric power consumption by a battery is increased. Thus, the threshold value Thre_turea is set at the freezing temperature Tfr+20° C., for example.

The defrosting control by the defrosting control section 101 is not limited to the above example. For example, the heating device other than the electrothermal heater 92 may be actuated. In addition, also in the case where it is estimated that the urea aqueous solution is frozen again on the basis of the sensor values of the various sensors during the operation of the engine 5, the defrosting control section 101 may open the switching valve 81, energize the electrothermal heater 92, and execute the heat-retention control.

The crystallization estimation section 107 estimates whether the valve body of the injector 31 is stuck due to crystallization of urea in the injector 31 at the start-up of the engine 5. A method for estimating the crystallization of urea is not particularly limited. For example, it can be estimated whether the urea crystals are precipitated in the injector 31 on the basis of a situation during the last stop of the engine 5. A brief description will hereinafter be made on one example of the method for estimating the crystallization of urea.

For example, the crystallization estimation section 107 successively records an estimated heat reception amount and an estimated heat radiation amount of the injector 31 during the operation of the engine 5. In addition, at the stop of the engine 5, the crystallization estimation section 107 stores a heat amount possessed by the injector 31 at the time point. At the start-up of the engine 5, the crystallization estimation section 107 reads out and compares the stored heat amount of the injector 31 with a threshold value, which is set in advance. Then, in the case where the heat amount of the injector 31 is equal to or larger than the threshold value, the crystallization estimation section 107 estimates that the urea crystals are possibly precipitated in the injector 31.

The estimated defrosting time calculation section 103 calculates an estimated defrosting time Tdef that is required to defrost the frozen urea aqueous solution. For example, based on the temperature Turea of the urea aqueous solution in the storage tank 50 or the pump module 40, the estimated defrosting time calculation section 103 may calculate the estimated defrosting time Tdef, which is set in advance. In the control device 100 according to this embodiment, the defrosting control section 101 determines actuation or non-actuation of the electrothermal heater 92 and the like in accordance with the temperature Turea of the urea aqueous solution. Accordingly, the estimated defrosting time Tdef that corresponds to the temperature Turea of the urea aqueous solution can be calculated in advance by a simulation or the like.

Information on the estimated defrosting time Tdef that is set for every temperature Turea of the urea aqueous solution is stored in the control device 100. In this way, the estimated defrosting time Tdef can be calculated by referring to the information. The estimated defrosting time Tdef can be zero. This case means that the urea aqueous solution is in a defrosted state. Note that a method for calculating the estimated defrosting time Tdef is not limited to such an example, and the estimated defrosting time Tdef can be calculated by an appropriate method, for which the outside air temperature is taken into consideration in addition to the temperature Turea of the urea aqueous solution, or the like.

The energization time setting section 105 sets a time in which the coil of the injector 31 is energized to melt the urea crystals precipitated in the injector 31 at the early stage. For example, the energization time setting section 105 may set an energization time T2 on the basis of the outside air temperature Ta. The coil of the injector 31 is energized to induce the heat in the coil and thereby promote melting of the urea crystals in the injector 31. Here, the heat amount that the injector 31 can receive from generated heat of the coil or the exhaust heat after the start-up of the engine 5 can be predicted in advance. Accordingly, a time until the temperature of the injector 31 reaches a specified temperature can be estimated in accordance with the outside air temperature Ta, which can be regarded as a temperature at a time point at which the injector 31 starts being heated.

The set energization time T2 may be set as a time until the temperature of the injector 31 reaches a melting point of the urea crystals or may be set to be shorter than the time. The urea aqueous solution is supplied to the injector 31 after the urea aqueous solution is defrosted. Here, it has been known that the urea crystals are more likely to be dissolved in the urea aqueous solution as the temperature is increased. Accordingly, in this embodiment, a method for promoting melting of the urea crystals is not limited to melting of the urea crystals at the high temperature but also includes facilitated dissolution of the urea crystals in the urea aqueous solution by heating the injector 31.

However, a method for setting the energization time T2 is not limited to such an example. For example, the energization time T2 may be set on the basis of the temperature Tcol of the coolant of the engine 5 instead of the outside air temperature Ta or in addition to the outside air temperature Ta. This is because the temperature Tcol of the coolant is also a value that is related to the temperature at the time point at which the injector 31 starts being heated.

Furthermore, when the energization time T2 is set, the voltage Vbat of a supply source of the electric power that is supplied to the injector 31 may be taken into consideration. For example, in the case where the voltage Vbat is lowered, the energization time T2 may be set to be short, or the energization control may be stopped. When the energization time T2 is set in consideration of the voltage Vbat, the energization time T2 can be multiplied by a coefficient that corresponds to a value of the voltage Vbat, or can be subtracted in accordance with the value of the voltage Vbat.

Note that the energization time T2 may be a fixed value instead of being set for each case. In this case, the control device 100 can be configured not to have the energization time setting section 105. Also in the case where the energization time T2 is the fixed value regardless of the outside air temperature Ta and the like, melting of the urea crystals can be promoted by increasing the temperature of the injector 31 through the energization only for a short time.

The energization control section 110 energizes the injector 31 in a state where the exhaust gas temperature Tgas is equal to or higher than a specified first threshold value Thre_tgas_1. Accordingly, when the injector 31 starts being energized, the exhaust pipe 11 and the like are in warmed states by the exhaust heat. Thus, of the heat amount generated by the coil, a heat amount that is transferred to a portion other than the valve body of the injector 31, the exhaust pipe 11, and the like can further be reduced. For example, the first threshold value Thre_tgas_1 can be set as a lower temperature than a second threshold value Thre_tgas_2, at which actuation of the urea SCR system 10 is permitted, by several tens of degrees.

In addition, in this embodiment, in the cases where the crystallization of urea is estimated and the valve body of the injector 31 is stuck, the energization control section 110 energizes the coil of the injector 31 for the energization time T2 before a lapse of the estimated defrosting time Tdef, which is calculated by the estimated defrosting time calculation section 103. In this way, the coil generates the heat, and thus the temperature of the injector 31 can be increased. As a result, melting of the urea crystals that are precipitated in the injector 31 can be promoted. At this time, a value of a current that is supplied to the injector 31 is preferably set to a value in such a degree that the valve body of the injector 31 is not lifted. Such energization control is executed before the urea aqueous solution is supplied to the injector 31. It is because, in the case where the valve body is lifted, the valve body thereafter abuts against a valve seat, which possibly causes abrasion of the valve body or the valve seat.

In addition, the energization control section 110 energizes the injector 31 such that termination timing of the estimated defrosting time Tdef matches termination timing of the energization time T2. More specifically, the energization control section 110 sets a time that is obtained by subtracting the energization time T2 from the estimated defrosting time Tdef as a threshold value T1, and starts energizing the injector 31 when an execution time of the defrosting control (a defrosting execution time) by the defrosting control section 101 reaches the threshold value T1.

In this way, it is possible to prevent a delay of timing at which the pump 41 starts supplying the urea aqueous solution after defrosting of the urea aqueous solution is terminated. In addition, an energization period of the injector 31 is delayed as much as possible. In this way, the coil of the injector 31 can generate the heat in a state where the temperature of the injector 31 or the exhaust pipe 11 or the like around the injector 31 is increased. Accordingly, the heat amount that is transferred to the part other than the valve body of the injector 31, the exhaust pipe 11, and the like can be reduced, and heating efficiency of the valve body can be improved. Thus, an energization time that is required to heat a region where the crystals are precipitated to the same degree can be shortened, and an electric power amount can be suppressed. In addition, shortening of the energization time leads to suppression of thermal deterioration of the coil.

When the energization time T2 elapses from the start of the energization of the injector 31, the energization control section 110 sets a flag or the like to permit the actuation of the urea SCR system 10. In this case, the defrosting control of the urea aqueous solution is completed. When the exhaust gas temperature Tgas exceeds the second threshold value Thre_tgas_2, the pump 41 starts being driven, to fill the reducing agent injection device 20 with the urea aqueous solution. At this time, the injector 31 is heated. Thus, the urea crystals in the injector 31 have been melted or are promptly melted by the urea aqueous solution reaching thereto. Therefore, injection control of the urea aqueous solution by the injector 31 can promptly be started.

Note that the energization control section 110 immediately permits the actuation of the urea SCR system 10 in the cases where the crystallization of urea is not estimated and the valve body of the injector 31 is not stuck. In this case, after the defrosting control of the urea aqueous solution is completed and the exhaust gas temperature Tgas exceeds the second threshold value Thre_tgas_2, the pump 41 starts being driven to fill the reducing agent injection device 20 with the urea aqueous solution.

Next, a description will be made on melting promotion control of the urea crystals at the start-up of the engine 5 as a control method for the reducing agent injection device that is executed by the control device 100 according to this embodiment with reference to FIG. 4 to FIG. 6. A routine of the control method, which will be described below, may be executed at each start-up of the engine 5.

Figure 4:
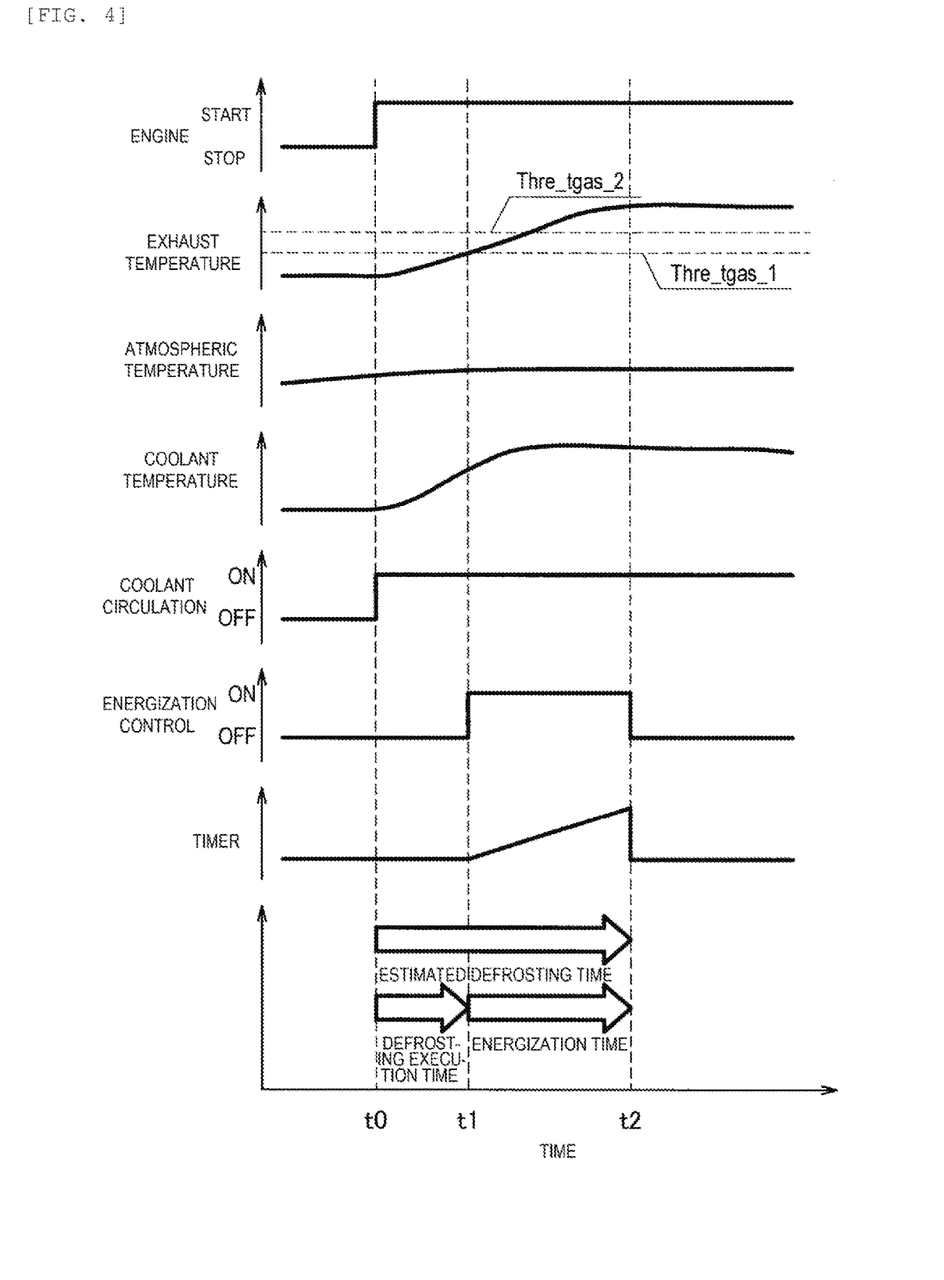
FIG. 4 is a time chart for illustrating a control method for the reducing agent injection device according to the same embodiment.
Figure 5:
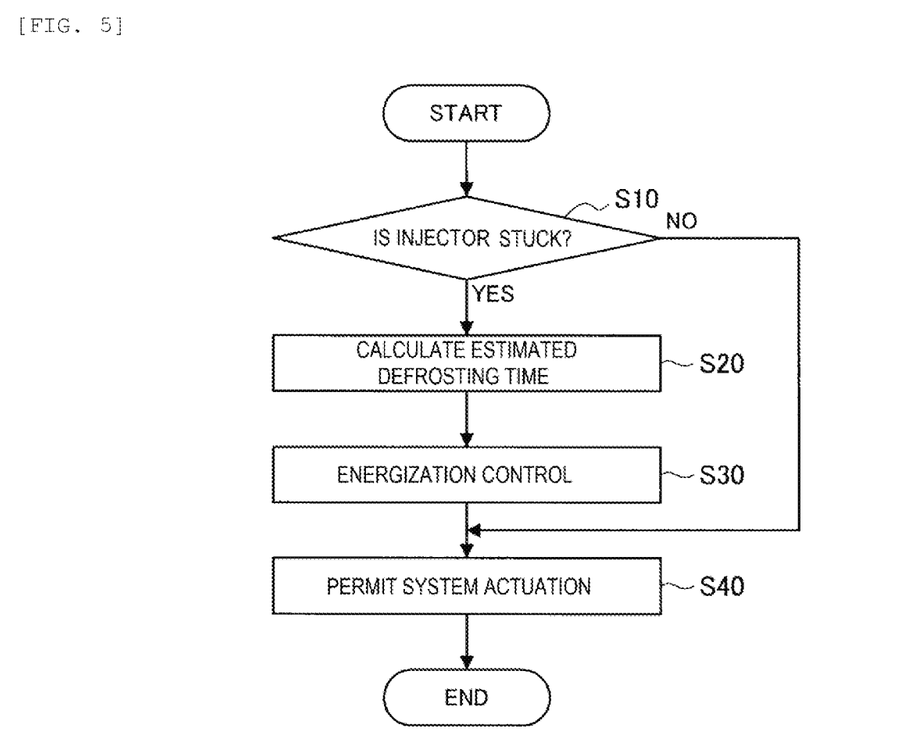
FIG. 5 is a flow chart for illustrating the control method for the reducing agent injection device according to the same embodiment.

FIG. 4 is a time chart for illustrating the melting promotion control of the urea crystals, and FIG. 5 is a flowchart for illustrating the melting promotion control of the urea crystals. FIG. 6 is a flow chart for illustrating energization control processing in detail. Note that the following description will be made by also referring to FIG. 1 and FIG. 3.

First, when an ignition switch is turned on (t0 in FIG. 4), in step S10, the crystallization estimation section 107 of the control device 100 reads a status that is stored at the last stop of the engine 5 and determines whether the injector 31 is stuck due to the crystallization of urea. If the injector 31 is not stuck due to the crystallization of urea (step S10: No), the control device 100 permits the actuation of the urea SCR system 10. In this case, after the defrosting control of the urea aqueous solution is completed and the exhaust gas temperature Tgas reaches the second threshold value Thre_tgas_2, the control device 100 starts driving the pump 41 and starts the injection control of the urea aqueous solution.

On the other hand, if the injector 31 is stuck due to the crystallization of urea (step S10: Yes), the estimated defrosting time calculation section 103 of the control device 100 calculates the estimated defrosting time Tdef in step S20. As described above, the estimated defrosting time calculation section 103 calculates the estimated defrosting time Tdef on the basis of the temperature Turea of the urea aqueous solution in the storage tank 50, for example. Next, in step S30, the control device 100 executes the energization control.

Figure 6:
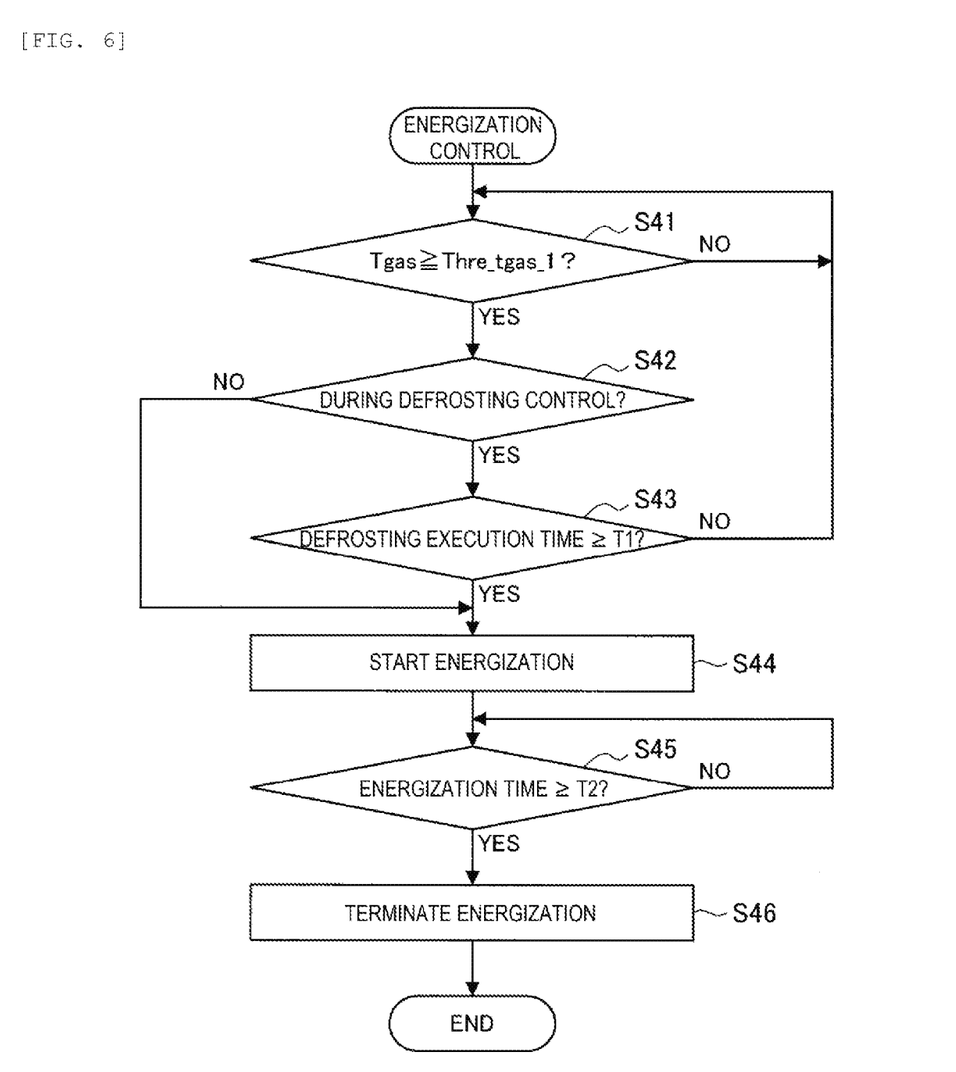
FIG. 6 is a flow chart for illustrating energization control processing for an injector.

The energization control is executed as depicted in FIG. 6, for example. First, in step S41, the energization control section 110 of the control device 100 determines whether the exhaust gas temperature Tgas is equal to or higher than the first threshold value Thre_tgas_1. If the exhaust gas temperature Tgas is lower than a first threshold value Thre_tgas_1 (step S41: No), the energization control section 110 waits until the exhaust gas temperature Tgas becomes equal to or higher than the first threshold value Thre_tgas_1.

If the exhaust gas temperature Tgas becomes equal to or higher than the first threshold value Thre_tgas_1 (step S41: Yes), the energization control section 110 determines in step S42 whether the defrosting control is currently executed. If the defrosting control is currently executed (step S42: Yes), the energization control section 110 determines in step S43 whether the defrosting execution time so far is equal to or longer than the threshold value T1. The threshold value T1 can be the value that is obtained by subtracting the energization time T2 from the estimated defrosting time Tdef calculated in step S20. The energization time T2 is set by the energization time setting section 105 on the basis of the outside air temperature Ta, the temperature Tcol of the coolant, the power supply voltage Vbat of the injector 31, and the like.

If the defrosting execution time so far is shorter than the threshold value T1 (step S43: No), the processing returns to step S41, and the control device 100 repeats the processing in each of the steps so far. On the other hand, if the defrosting execution time so far is equal to or longer than the threshold value T1 (step S43: Yes), the energization control section 110 starts energizing the coil of the injector 31 in step S44 (t1 in FIG. 4). If the defrosting control is unnecessary (including a case where a defrosting execution time is zero) in above step S42, or if the defrosting control has already been terminated (step S42: No), the processing proceeds to step S44 at this time point, and the energization control section 110 starts energizing the coil of the injector 31.

The value of the current that is supplied to the injector 31 is set in such a range where the valve body of the injector 31 is not lifted. After the energization of the coil of the injector 31 is started, in step S45, the energization control section 110 repeats determining whether the energization time reaches the threshold value T2 (in a period from t1 to t2 in FIG. 4). If the energization time reaches the threshold value T2 (step S45: Yes), the energization control section 110 stops energizing the coil of the injector 31 in step S46. In this way, the energization control of the coil of the injector 31 is terminated (t2 in FIG. 4).

After the energization control is terminated, the processing proceeds to step S40 in FIG. 5, and the energization control section 110 permits the actuation of the urea SCR system 10. In this case, the defrosting control of the urea aqueous solution has already been terminated, and the exhaust gas temperature Tgas has reached the second threshold value Thre_tgas_2. Accordingly, the control device 100 promptly starts driving the pump 41 and starts the injection control of the urea aqueous solution. At this time, the injector 31 is heated. Thus, the urea crystals in the injector 31 have been melted or are promptly melted by the urea aqueous solution.

According to the reducing agent injection device 20 according to this embodiment that has been described so far, the coil of the injector 31 is energized after the exhaust gas temperature Tgas becomes equal to or higher than the first threshold value Thre_tgas_1. In addition, such a reducing agent injection device 20 calculates the required energization time T2, and then energizes the coil such that the energization time T2 is finished at the same time as finish timing of the estimated defrosting time that is estimated as the time in which the frozen urea aqueous solution is defrosted. Accordingly, the coil is energized for the minimally-required energization time T2 in the state where the exhaust pipe 11 and the injector 31 are warmed to certain extent. In this way, the injector 31 is efficiently heated. Therefore, the amount of the electric power consumption by the battery is reduced, and the deterioration of the coil, which is caused by generation of the heat, can be suppressed.

The preferred embodiment of the invention has been described in detail so far with reference to the accompanying drawings. However, the invention is not limited to such an embodiment. It is apparent that various modified examples or correction examples can be conceived by a person with common knowledge in the technical field, to which the invention pertains, within the scope of the technical idea described in the claims. It is understood that these naturally belong to the technical field of the invention.

What is claimed is:

1. A microcomputer control device for a reducing agent injection device, the microcomputer control device configured to cause the reducing agent injection device to fill with a reducing agent at a start-up of an internal combustion engine and to control injection of the reducing agent into an exhaust passage of the internal combustion engine by an injector, the microcomputer control device further configured to:
perform energization control in which, after an exhaust temperature of the internal combustion engine becomes equal to or higher than a specified threshold value, a temperature of the injector is increased by energizing a coil of the injector for a specified time and melting of crystals of the reducing agent precipitated in the injector is promoted;

calculate an estimated defrosting time required to defrost the frozen reducing agent at the start-up of the internal combustion engine; and in the case where the estimated defrosting time is not zero, start energizing the coil of the injector before a lapse of the estimated defrosting time after the exhaust temperature of the internal combustion engine becomes equal to or higher than the specified threshold value.

2. The microcomputer control device of claim 1 further configured to start energizing the coil when a defrosting execution time reaches a threshold value obtained by subtracting the specified time from the estimated defrosting time.

3. The microcomputer control device of claim 1 further configured to in the case where the estimated defrosting time is zero, start energizing the coil when the exhaust temperature of the internal combustion engine becomes equal to or higher than the specified threshold value.

4. The microcomputer control device of claim 1 wherein the specified time is set in advance.

5. The microcomputer control device of claim 1 wherein the specified time is set at least on the basis of an outside air temperature.

6. The microcomputer control device of claim 5 wherein the specified time is further set on the basis of a power supply voltage of the injector.

7. The microcomputer control device of claim 1 wherein an estimated defrosting time calculation section calculates the estimated defrosting time at least on the basis of a temperature of the reducing agent.

8. The microcomputer control device of claim 1 wherein an energization control section permits execution of injection control of the reducing agent after a lapse of the specified time.

9. The microcomputer control device of claim 1 further configured to:

estimate whether the crystals are precipitated in the injector before a last stop of the internal combustion engine and control energization of the coil when precipitation of the crystals is estimated.

10. A control method for a reducing agent injection device, the control method performed by an microcomputer programmed to execute the control method, the control method comprising:

filling the reducing agent injection device with a reducing agent at a start-up of an internal combustion engine;

controlling injection of the reducing agent into an exhaust passage of the internal combustion engine by an injector;

increasing a temperature of the injector by energizing a coil of the injector for a specified time;

promoting melting of crystals of the reducing agent precipitated in the injector, calculating an estimated defrosting time required to defrost the frozen reducing agent at the start-up of the internal combustion engine; and in the case where the estimated defrosting time is not zero, starting energizing the coil of the injector before a lapse of the estimated defrosting time after an exhaust temperature of the internal combustion engine becomes equal to or higher than a specified threshold value.

11. A reducing agent injection device comprising:

the microcomputer control device according to claim 1;

a pump that pressure-feeds a reducing agent in a storage tank; and an injector that injects the reducing agent into an exhaust passage of an internal combustion engine.

* * * * *